Figure 1:
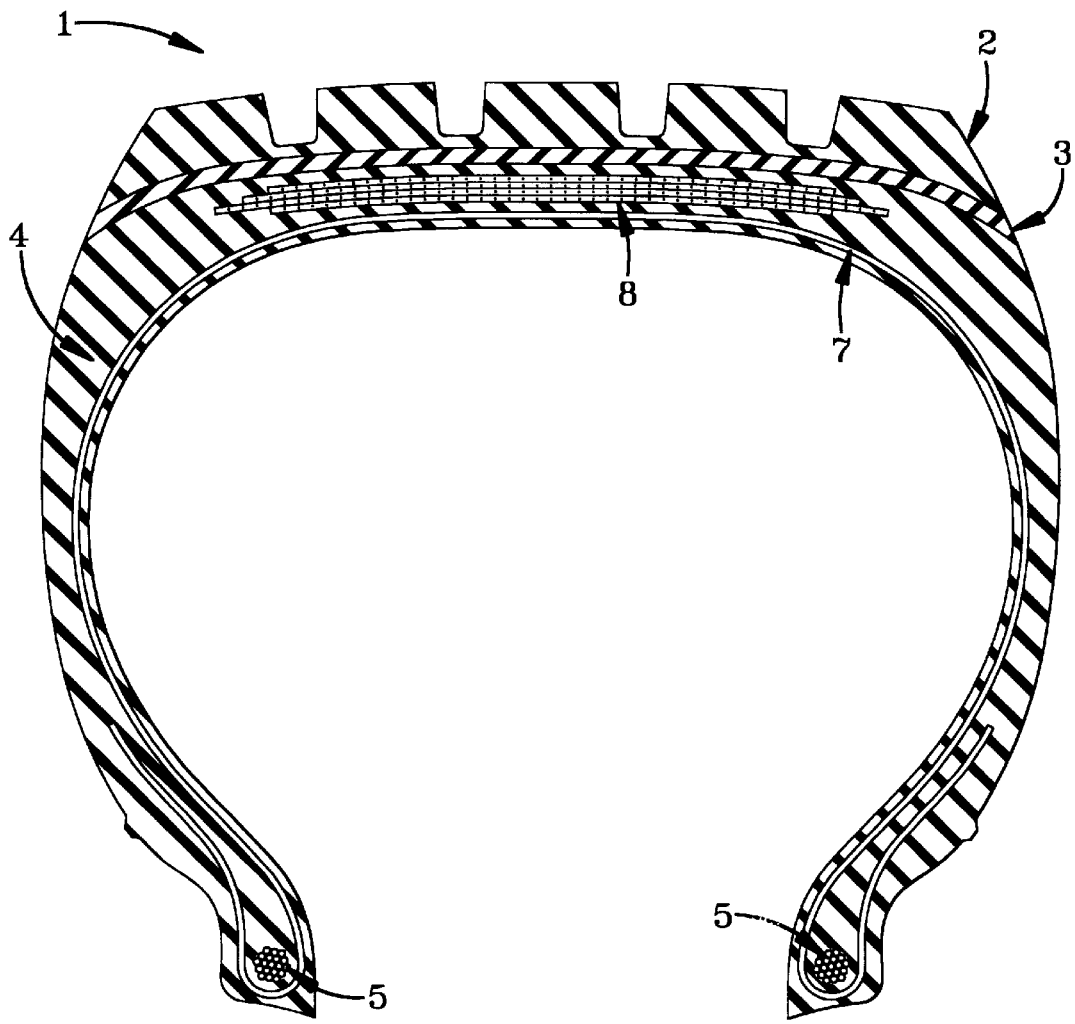

United States Patent [19]
Ryba et al.

[11] Patent Number: 5,843,249
[45] Date of Patent: Dec. 1, 1998

[54] TRUCK TIRE WITH CAP/BASE CONSTRUCTION TREAD

[75] Inventors: Jennifer Lyn Ryba, Wadsworth; Michael Brendan Rodgers, Akron; Stanley Michael Mezynski, Mogadore, all of Ohio

[73] Assignee: The Goodyear Tire & Rubber Company, Akron, Ohio

[21] Appl. No.: 612,467

[22] Filed: Mar. 7, 1996

[51] Int. Cl.[6] .............................. B60C 1/00; B60C 11/00
[52] U.S. Cl. ........................................................ 152/209 R
[58] Field of Search ............................ 152/209 R, 209 D

[56] References Cited

U.S. PATENT DOCUMENTS

| | | | |
|---|---|---|---|
| 3,157,218 | 11/1964 | Brown | 152/209 R |
| 3,830,275 | 8/1974 | Russell | 152/209 R |
| 4,381,810 | 5/1983 | Cady et al. | 152/209 R |
| 4,417,027 | 11/1983 | Kan et al. | 525/99 |
| 4,527,606 | 7/1985 | Kita et al. | 152/209 R |
| 4,635,693 | 1/1987 | Ahagon et al. | 152/209 R |
| 4,908,401 | 3/1990 | Ohara et al. | 524/495 |
| 5,385,969 | 1/1995 | Saito et al. | 524/496 |
| 5,397,616 | 3/1995 | Aoki | 152/209 R |
| 5,504,140 | 4/1996 | Zanzig et al. | 525/237 |
| 5,534,578 | 7/1996 | Wideman et al. | 524/493 |

FOREIGN PATENT DOCUMENTS

| | | | |
|---|---|---|---|
| 3635587 | 4/1987 | Germany | 152/209 R |

*Primary Examiner*—Steven D. Maki
*Attorney, Agent, or Firm*—Henry C Young, Jr.

[57] ABSTRACT

The invention relates to a truck or bus tire with a rubber tread of cap/base construction where the tread cap is composed of an emulsion polymerization prepared styrene/butadiene copolymer elastomer with a relatively random styrene content (E-SBR-A). Such E-SBR-A, in its uncured state, also has a relatively low Tg. In one aspect, the tire tread's tread cap may also be a blend of elastomers such as cis 1,4-polybutadiene and/or natural rubber together with said E-SBR-A and wherein the tread base elastomer is composed primarily of natural cis 1,4-polyisoprene rubber. In another aspect of the invention, said tread cap has a tread design composed of at least three circumferential continuous ribs designed to be road contacting, said ribs independently separated by continuous, circumferential grooves.

6 Claims, 2 Drawing Sheets

TRUCK TIRE WITH CAP/BASE CONSTRUCTION TREAD

FIELD

The invention relates to a truck, or bus, tire with a rubber tread of cap/base construction where the tread cap is composed of an emulsion polymerization prepared styrene/butadiene copolymer elastomer with a relatively random styrene content (E-SBR-A). Such E-SBR-A, in its uncured state, also has a relatively low Tg.

In one aspect, the tread cap may also be a blend of elastomers such as cis 1,4-polybutadiene and/or natural rubber together with said E-SBR-A and wherein the tread base elastomer is composed primarily of natural cis 1,4-polyisoprene rubber.

In another aspect of the invention, said tread cap has a tread design composed of at least three circumferential continuous ribs designed to be road contacting, said ribs independently separated by continuous, circumferential grooves.

BACKGROUND

Pneumatic rubber tires are conventionally prepared with a rubber tread which can be a blend of various rubbers which is typically reinforced with carbon black.

In one aspect, tires such as, for example, truck tires and other relatively large tires including relatively heavy duty light truck tires, which are normally expected to be capable of supporting and carrying relatively large vehicular loads, tend to generate a greater internal temperature than comparable passenger vehicle-type tires.

The truck tire treads are typically of a cap/base construction, with the tread cap designed to be ground-contacting and, thus, contain a lug/groove ground-contacting configuration, and with the tread base underlying and supporting the tread cap and positioned between the tread cap and the tire casing. Generally, the tread cap and tread base are a co-extruded component of the tire. The tread base is not intended to normally be ground-contacting and, thus, not normally intended to have the same measure of tread properties as, for example, the tread cap properties of traction and treadwear resistance.

Such truck tires, particularly bus tires, where the tread design is composed primarily of a multiplicity of at least three continuous circumferential ribs individually separated from each other by continuous circumferential grooves therebetween.

For such relatively heavy duty tires, heat buildup, evidenced by tire running temperature buildup, or increase, is normally unwanted, although a substantial portion of the heat buildup, or temperature increase, is relatively unavoidable during a running of the tire under load.

However, it remains to be desirable to provide a rubber tire tread for use with tires on various trucks and buses, including light to medium trucks and buses, which will generate less heat under typical operational conditions particularly since higher tire running conditions tend to prematurely age the tire rubber and associated tire construction and, thus, tend to shorten the effective life of the tire, which may include the tire casing. The effective life of the tire casing is considered herein to be important because it is desirable to retread the tire casing after the tire tread becomes worn.

In another aspect, it is desired to provide such a tire which can generate less heat under operational conditions, yet have acceptable treadwear and traction (skid resistance).

It is envisioned that such tread would be of a cap/base construction where the tread base is of a natural rubber composition reinforced with carbon black and optionally with a combination of carbon black and silia. A cap/base construction for tire treads is well known to those skilled in such tire tread art. For example, see U.S. Pat. No. 3,157,218 which is intended to be incorporated herein by reference as being illustrative of such tread construction.

Conventionally, truck tire (including bus tires) tread cap rubber compositions are composed predominately of natural rubber (natural cis 1,4-polyisoprene rubber) in order to achieve satisfactory heat durability and cool running characteristics. Other elastomers are often mixed with the natural rubber for such tread caps such as, for example, styrene/butadiene copolymer rubber and sometimes cis 1,4-polybutadiene rubber.

In practice for preparation of tire treads, various rubbers, or elastomers, are typically evaluated, selected and blended for a purpose of achieving desired tire tread properties and particularly a balance of tire tread characteristic properties, mainly, rolling resistance, traction and wear.

For various applications utilizing rubber including applications such as tires and particularly tire treads, sulfur cured rubber is utilized which contains substantial amounts of reinforcing filler(s). Carbon black is commonly used for such purpose and normally provides or enhances good physical properties for the sulfur cured rubber. Particulate silica might also sometimes be used for such purpose, particularly if the silica is used in conjunction with a coupling agent. In some cases, a combination of silica and carbon black has been utilized for reinforcing fillers for various rubber products, including treads for tires.

The term "phr" where used herein, and according to conventional practice, refers to "parts of a respective material per 100 parts by weight of rubber, or elastomer".

In the description of this invention, the terms "rubber" and "elastomer", where used herein unless otherwise prescribed, are used interchangeably. The terms "rubber composition", "compounded rubber" and "rubber compound" where used herein unless otherwise prescribed, are used interchangeably to refer to "rubber which has been blended or mixed with various ingredients or materials" and such terms are well known to those having skill in the rubber mixing, or rubber compounding, art.

The Tg of a polymer, particularly an elastomer, as used herein unless otherwise prescribed, refers to its glass transition temperature which can conventionally be determined, for example, by a differential scanning calorimeter at heating rate of 15° C., sometimes alternatively at about 10° C., to an observed transition of the temperature versus time curve. It is understood that such Tg determination is well known to those having skill in such art.

SUMMARY AND PRACTICE OF THE INVENTION

In accordance with this invention, a pneumatic tire having a TRA rated maximum load limit of at least about 2684 lbs, (1220 kg) alternatively at least about 6934 lbs, (3150 kg) and generally in a range of about 4500 lbs to about 11,015 lbs (about 2043 to about 5000 kg) at an inflation pressure in a range of about 80 to about 120 psi (about 550 to about 830 kpa) and a tire bead diameter of at least about 19 inches (48 cm), alternatively at least about 22 inches (56 cm), and generally in a range of about 19 to about 25 inches, (about 48 to about 64 cm), is provided having a rubber tread or, optionally, a rubber tread of a cap/base construction wherein:

(A) the tread cap is comprised of, based on 100 parts by weight rubber, (1) about 25 to 100, alternatively 50 to about 100 or about 40 to about 90, alternatively about 60 to about 90, phr of emulsion polymerization prepared styrene/butadiene polymer having a bound styrene content of between 5 and 15 weight percent and, a Tg in a range of about −65° C. to about −80° C., and a random styrene distribution as evidenced by having less than ten percent of its styrene in ten or more sequential styrene units (E-SBR-A), and correspondingly (2) zero to about 75, alternatively zero to about 50 or about 10 to about 60, alternatively about 10 to about 40, phr of at least one additional elastomer selected from at least one of cis 1,4-polyisoprene natural rubber and diene based synthetic rubbers, and (B) the tread base elastomer is comprised of 100 parts by weight cis 1,4-polyisoprene natural rubber.

In one aspect of the invention, said tread cap has a tread design composed of at least three circumferential continuous ribs designed to be road contacting, said ribs independently separated by continuous, circumferential grooves.

The tread base natural rubber elastomer composition may also be modified by the addition of up to about 30, and alternatively about zero to about 20, or about 10 to about 20, phr of one or more additional synthetic diene based elastomer(s).

The said additional synthetic elastomers for the said tread cap or for said tread base may be selected from, for example, emulsion polymerization prepared styrene/butadiene copolymer having a bound styrene content of about 20 to about 40, or about 20 to about 30, weight percent and a Tg in a range of about −50° C. to about −65° C. (E-SBR-B), organic solution polymerization prepared styrene/butadiene copolymer (S-SBR), cis 1,4-polybutadiene elastomer, medium to high vinyl polybutadiene rubber having a vinyl content from about 30 to about 90 percent, trans 1,4-polybutadiene elastomer, isoprene/butadiene copolymer rubber and styrene/isoprene/butadiene terpolymer rubber. Such isoprene/butadiene copolymer elastomer may have an isoprene content in a range of about 5 to about 90, alternatively about 30 to about 70, percent.

The said tread base rubber, while being carbon black reinforced may also contain a blend of silica and carbon black with silica ranging from zero to about 100 weight percent of the reinforcing filler. With the silica, usually a silane coupling agent is also used. Such silane coupling agents typically has a silane moiety reactive with the surface of the silica and a moiety interactive with said elastomers.

The rubber blends for the tread cap containing the said required E-SBR-A emulsion polymerization prepared styrene/butadiene copolymer elastomer with the random styrene distribution is considered herein to be an important feature of the invention designed to reduce heat build-up properties of the truck tread.

In one aspect, the styrene/butadiene copolymer elastomer (E-SBR-A), may have a styrene content of about 5 to about 15, usually about 8 to about 15, percent.

In practice, the E-SBR-A can suitably be prepared, for example, by batch or continuous emulsion polymerization process run at a temperature of about 41° F. (5° C.) to 55° F. (12.7° C.) utilizing an increment of chain transfer agent (e.g. $C_{12}$ tertiary dodecyl mercaptan) at 45 to 50% conversion of monomer to polymer. The polymerization is terminated (with, for example, diethylhydroxylamine and sodium dimethyldithiocarbamate) at 60 to 65% conversion.

It is significant that the styrene of the E-SBR-A is considered herein to be of a random distribution in the elastomer. This means that the polymer chains are heterogenous as distinguished from the ordered structure of solution polymerization of styrene and 1,3-butadiene. The random distribution of the styrene can be determined by NMR (nuclear magnetic resonance) and its microstructure. The E-SBR-A microstructure can be described as somewhat determined by the polymerization temperature, namely, approximately 72% trans-1,4, 12% cis 1,4 and 16 ⅔ 1,2.

In the practice of this invention, a contribution of the styrene/butadiene copolymer elastomer (E-SBR-A) for the tread cap is believed to, in one aspect, aid in enhancing or promoting the tire tread's abrasion resistance property, particularly where it is applied to tires, such as truck and bus tires intended to operate in a relatively fast truck tire treadwear condition as would be expected for truck and bus tires operating under loaded conditions. In addition, the Tg for the E-SBR-A is lower than a typical Tg for the E-SBR-B thereby making available an improvement in tire rolling resistance.

Addition of the said cis 1,4-polybutadiene rubber (BR) to a tire tread containing the said E-SBR-A is believed to be beneficial to enhance the tire treadwear. The BR can have a cis 1,4-content in a range of about 92 to about 99 percent or, alternatively, about 30 to about 45 percent depending on the manufacturing process. The Tg of such polybutadiene polymers will typically fall within the range of about −65° C. to about −104° C.

The use of such BR in rubber blend for tread rubber is well known to those having skill in such art.

The synthetic elastomers can be prepared, for example, by organic solution polymerization of respective monomers and their preparation is well known to those skilled in such art.

The use of cis 1,4-polyisoprene rubber, particularly and preferably as natural rubber, in tire treads is well known to those having skill in the such art.

Thus, in the practice of this invention, for the tread cap, the elastomer for the rubber composition can be entirely (100 percent) of the said E-SBR-A elastomer or a balanced rubber blend of (i) two elastomers composed of the said E-SBR-A and natural cis 1,4-polyisoprene rubber of which the E-SBR-A is a major portion (at least 50 weight percent) or (ii) at least three elastomers composed of at least 50 weight percent of said E-SBR-A, about 10 to about 50 weight percent natural cis 1,4-polyisoprene rubber and about 10 to about 50 weight percent of at least one other elastomer selected from E-SBR-B, S-SBR and cis 1,4-polybutadiene rubber.

Such basic rubber, or rubber blend, for the tread cap is considered herein to be an important feature of the invention and designed to balance tire performance requirements of treadwear, heat buildup, rolling resistance and traction characteristics.

It is to be appreciated that the elastomer composition relies upon a reinforcing filler which is composed primarily of carbon black but which can also contain silica and an accompanying silica coupler for the reinforcing effect of the silica filler.

The aforesaid TRA "maximum rated load limit" characteristic of the tire is intended to differentiate a truck, or bus, tire typically designed for running under load conditions substantially higher than conventional passenger tire loads. The term "TRA" refers to "The Tire and Rim Association Inc." which is well known to those familiar with tire manufacturing. It is referred to herein as "TRA". The TRA is an association which has, as a purpose ". . . the establishment and promulgation of interchangeability standards for tires, rims and allied parts for the guidance of manufacturers of such products . . . ". The TRA publishes an annual Yearbook, for example the 1995 Yearbook, which includes, for example, characterizations of truck and bus tires and passenger tires, including maximum rated load values at various inflation pressures. It can readily be seen that, most bus and truck tires, particularly for medium truck tires and above, have maximum rated load values at various inflation pressures significantly greater than conventional passenger tires. Therefore, it is considered herein that such values effectively differentiate the intended truck or bus tires for this invention from passenger tires. For the purposes of the description of this invention, the rim diameters referenced in the TRA Yearbook are equated to tire bead diameters. Appropriately, the tire bead diameters are herein considered as being measured from the surface of the rubber encapsulated wire beads and not the wire portion of the beads, as is believed herein is appropriate.

It is further considered herein that the truck, including bus, tires of this invention have an appreciably greater need for relatively cooler running tires than passenger tires which are expected to be utilized for substantially reduced loads. For a tire tread to contribute significantly to the cooler running of a tire, it is considered herein that a tread of cap/base construction is desirable where the tread base is primarily composed of cis 1,4-polyisoprene natural rubber and where the tread cap and tread base compositions cooperate to promote such effect. In practice, such tread is created by co-extruding the tread cap and tread base together through a singular die to form the extruded tread construction. The compounded rubber compositions are extruded through the die at a temperature, for example, in a range of about 100° C. to about 125° C., often typically about 110° C. and, thus, is considered as being a relatively hot extrusion process, although such actual extrusion temperatures themselves are considered normal for a rubber extrusion process. The extruded tread stock is then built onto a rubber tire casing to create an assembly thereof. The assembly is then vulcanized, or cured, at an elevated temperature. Such overall process is well known to those skilled in such art. In this manner then, by the aforesaid co-extrusion process and the co-vulcanization of the tread cap and tread base, the tread cap and tread base are considered herein to be an integral, cooperative, unit of the tire. Therefore, it is considered herein that the tread cap and tread base desirably cooperate to promote the cooler running effect for the tire. By the term "cooler running for the tire tread" it is meant that "internal operating temperatures are sufficiently low so as to reduce, or retard, heat degradation of the tire tread rubber compositions". An example of such cooler running effect is intended to be manifested in a longer service life for the tire carcass, or casing. It is known to those having skill in truck or bus tire usage that cooler running tire treads are desirable in order to lengthen, or increase, tire life insofar as heat durability is concerned.

The accompanying drawings are provided for further understanding of the invention, although it is not intended that the invention be limited to the presentation of the drawings.

It is important to appreciate that the tread design in the drawings is not entirely to scale. In particular, it is envisioned that the tread design, as presented, may be composed of four continuous, circumferential ribs designed to be road contacting separated by three continuous, circumferential grooves, wherein the net to gross ratio of the tread cross-sectional outer surface composed of said ribs and grooves is in a range of about 76 to about 79 percent.

IN THE DRAWINGS

FIG. 1 is a cross-sectional view of a vulcanized tire showing a tread with a cap/base construction where the tread cap is intended to be of a rib and groove configuration, and where the tread base supports the tread cap and extends to the outer side surface of the tire, together with a portion of a supporting radial ply casing. The tire casing is the portion of the tire which conventionally includes the tire's two spaced apart bead portions, crown portion composed of the circumferential tread and supporting belts, and connecting sidewalls. Such tire casing construction is well known to those skilled in such art. The tire casing might sometimes be referred to as a "tire carcass".

Figure 2:
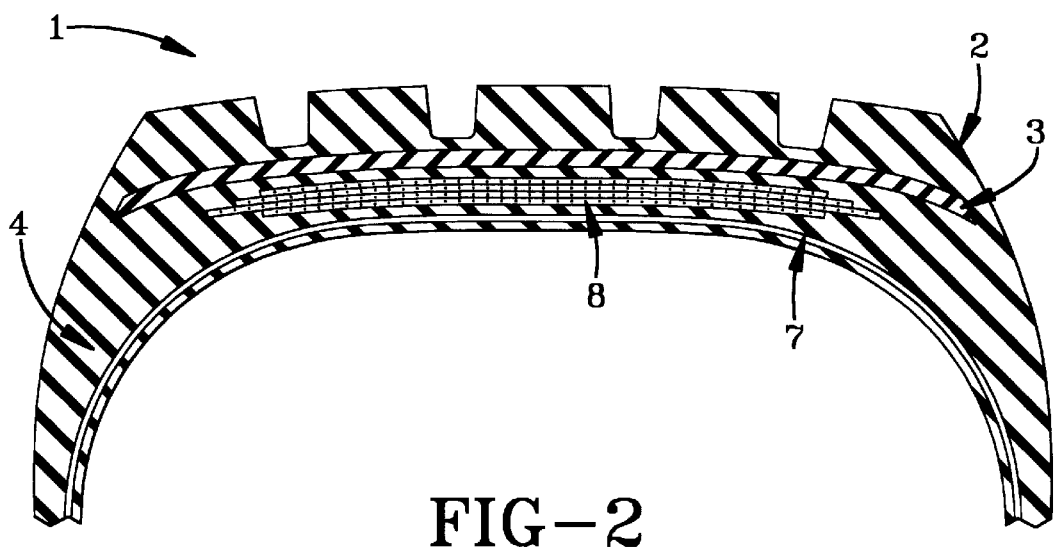

FIG. 2 is a cross-sectional view of a vulcanized tire showing a tread with a cap/base construction where the tread cap is intended to be of a rib and groove configuration, wherein the tread base supports the tread cap and terminates within the shoulder region of the tire casing.

Figure 3:
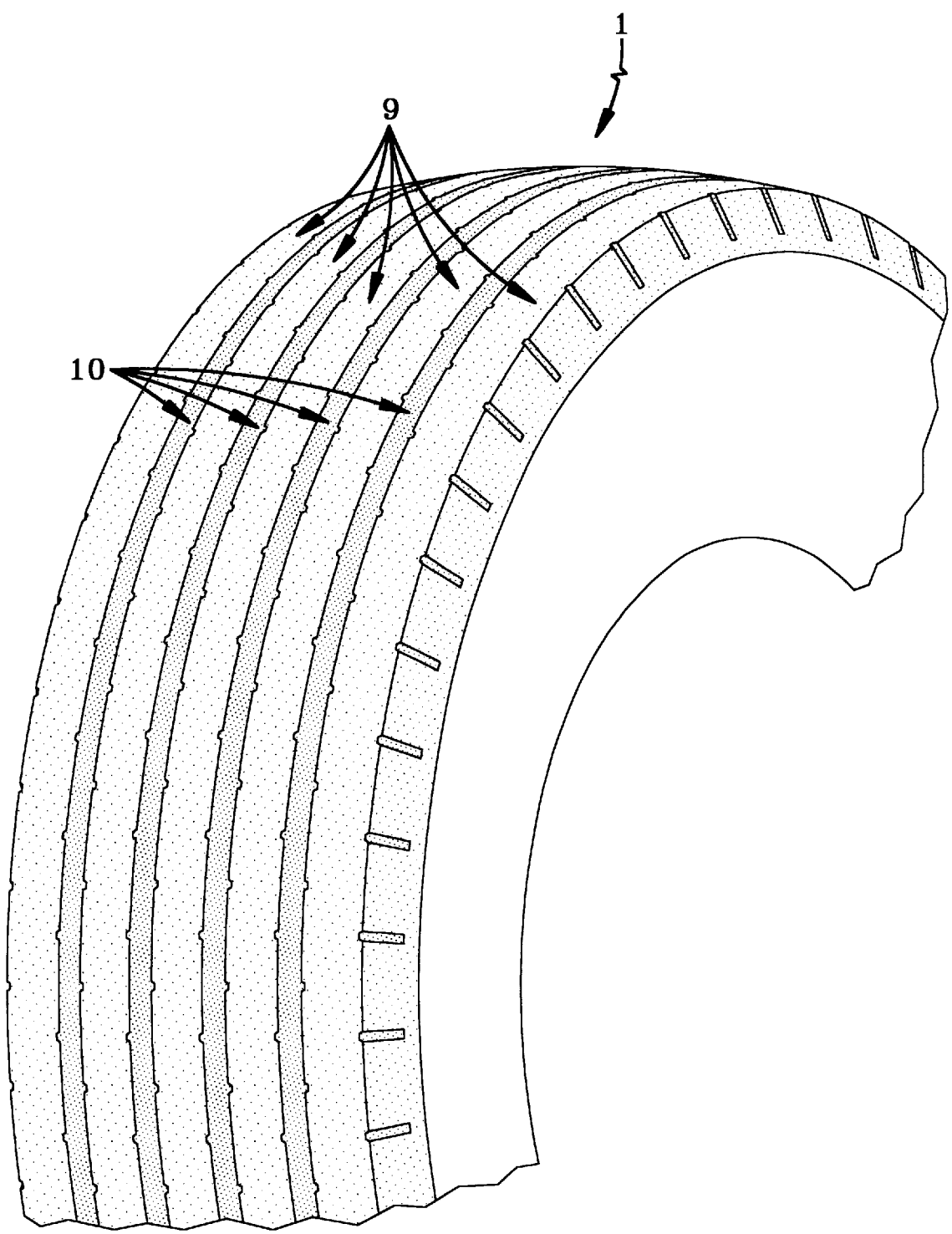

FIG. 3 is a perspective, cut away view of the tire 1 more clearly depicting five continuous circumferential ribs 9 separated by four continuous circumferential grooves 10. In practice, often times for bus tires, a tire tread configuration of four continuous circumferential ribs is provided.

Referring to the drawings, a tire construction 1 is provided with a circumferential tread component composed of a tread cap 2 and tread base 3 construction. The tread cap 2 and tread base 3 is a co-extruded component of the tire 1. The tire has a carbon black reinforced rubber casing 4 which is composed of spaced beads 5 encased with carbon black reinforced rubber, carbon black reinforced rubber sidewalls 6 and supporting casing plies 7 and circumferential belt 8. In one aspect, the casing ply 7 of the casing 4, for the truck tire; has steel cord reinforcement.

The rubber tread base 3 is carbon black reinforced with at least 30 phr of carbon black, and sometimes silica, usually a minor amount of silica as compared to the carbon black. The sidewall rubber 6 and rubber for the beads 5 are reinforced with at least about 40 phr of carbon black. The tread base elastomer is cis 1,4-polyisoprene natural rubber.

The rubber tread cap 2 is reinforced with a filler composed of carbon black which may also contain a minor amount of precipitated silica.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, silica and carbon black. As known to those skilled in the art, depending on the intended use of the sulfur vulcanizable and sulfur vulcanized material (rubbers), the additives mentioned above are selected and commonly used in conventional amounts.

Typical additions of reinforcing fillers for the tread cap such as carbon black, are usually in an amount of about 35 to about 65 phr. Typical additions of reinforcing fillers such as silica, if used, are usually in an amount of about 5 to about 20 phr, usually together with a silica coupler.

Typical amounts of tackifier resins, if used, comprise about 0.5 to about 10 phr, usually about 1 to about 5 phr. Typical amounts of processing aids comprise about 1 to about 30 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization rate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate and to improve the properties of the vulcanizate. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to a truck tire with a tread of cap/base construction where the tread cap is comprised of E-SBR-B and the tread base is comprised of natural rubber.

The presence and relative amounts of the above additives are not considered to be an aspect, except as may hereinbefore be set forth, of the present invention which is more primarily directed to the tire with cap/base construction utilizing various elastomers in the tread cap and tread base.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Rubber compositions (compounded rubber) were prepared of E-SBR-A with a styrene content of 12% and a Tg of −70° C. The compositions are referred to herein as Samples A, B and C.

A control rubber composition composed of emulsion polymerization prepared styrene/butadiene copolymer rubber (E-SBR-B), with a styrene content of 23.5% and a Tg of −58° C., identified herein as Sample X.

A tread base rubber composition was prepared composed of natural cis 1,4-polyisoprene rubber (NR) was prepared and identified herein as Sample Y.

The rubber compositions were prepared by mixing the ingredients in several sequential, non-productive mixing stages (without the curatives) and a final productive mixing stage (basically for the curatives), then the resulting composition was cured under conditions of elevated temperature and pressure, namely, for about 27 minutes for about 150° C.

For the non-productive mixing stages, exclusive of the accelerator(s), sulfur curatives, and antioxidant which are added in the final, productive mixing stage, all of the ingredients were mixed in the first non-productive stage except for about 20 to about 50 percent of the reinforcing filler(s) and processing oil, which were added in the second and third non-productive mixing stage. The ingredients may be mixed in each of the non-productive mixing stages for about one to about five minutes to a temperature of about 165° C., all in a Banbury internal type of mixer.

To the resulting rubber composition (mixture) may be then mixed, in the final, productive mixing stage, the remaining ingredients in a Banbury internal type mixer for about one to about 2 minutes to a temperature of about 110° C.

The rubber was then used to prepare a tire tread and the tire carcass and tread assembly vulcanized.

The rubber compositions were comprised of the ingredients illustrated in Table 1. The values, for the most part, are simply rounded to the nearest whole number.

TABLE 1

| | Sample # | | | | |
|---|---|---|---|---|---|
| | X | A | B | C | Y |
| Non-Productive Mix Stages | | | | | |
| S—SBR-A[1] | 0 | 100 | 100 | 100 | 0 |
| E-SBR—B[2] | 100 | 0 | 0 | 0 | 0 |
| NR[3] | 0 | 0 | 0 | 0 | 100 |
| Carbon Black[4] | 45 | 40 | 45 | 50 | 0 |
| Carbon Black[5] | 0 | 0 | 0 | 0 | 35 |
| Processing Oils | 9 | 9 | 9 | 9 | 2 |
| Fatty Acid[6] | 3 | 3 | 3 | 3 | 1 |
| Waxes | 1 | 1 | 1 | 1 | 2 |
| Productive Mix Stage | | | | | |
| Zinc Oxide | 3 | 3 | 3 | 3 | 5 |
| Antioxidants[7] | 3 | 3 | 3 | 3 | 3 |
| Sulfur | 1.6 | 1.6 | 1.6 | 1.6 | 1.4 |
| Sulfenamide, Guanidine, and Thiazole | 1.2 | 1.2 | 1.2 | 1.2 | 1.5 |

[1] An emulsion polymerization prepared styrene/butadiene copolymer elastomer having a styrene content of about 12 percent and a Tg of about −70° C. obtained from The Goodyear Tire & Rubber Company.
[2] An emulsion polymerization prepared styrene/butadiene copolymer elastomer having a styrene content of about 24 percent obtained as PLF 1502 from The Goodyear Tire & Rubber Company.
[3] Cis 1,4-polyisoprene natural rubber.
[4] SAF carbon black.
[5] HAF carbon black.
[6] Primarily stearic acid.
[7] Of the diarylparaphenylene diamine and dihydro-trimethylquinoline type Various properties of the cured samples were determined by conventional means and reported in the following Table 2.

TABLE 2

| | Sample # | | | | |
|---|---|---|---|---|---|
| | X | A | B | C | Y |
| 300% Modulus (MPa) | 8.2 | 6.3 | 7.4 | 9.0 | 11.7 |
| Tensile Strength (MPa) | 18.9 | 18.9 | 18.7 | 19.6 | 23.6 |
| Elongation (%) | 558 | 620 | 584 | 551 | 520 |
| Hardness | 62 | 57 | 60 | 64 | 58 |
| Rebound (100° C.) | 55 | 55 | 53 | 51 | 82 |
| Flexometer Temperature (°F.) | 57 | 66 | 67 | 70 | 22 |
| Percent Set | 2.7 | 5.4 | 4.6 | 4.0 | 0.8 |
| E' at 60° C. (MPa) | 14 | 10 | 14 | 18 | |
| Tan. Delta at 60° C. | .14 | .14 | .15 | .15 | .07 |
| Peel Adhesion (N/mm) | 20 | 20 | 23 | 28 | 20 |
| DIN Abrasion Rating | 92 | 76 | 76 | 72 | |

For the tensile elongation and 300% modulus values tests, refer to ASTM Test D412-92, method B.

For the rebound tests, refer to DIN 53512.

For the hardness, Shore A as in ASTM 2240-91 may be referred to at room temperature, or about 23° C.

For the flexometer test, refer to ASTM Test D623. The flexometer test is considered herein to be significant because it specifically measures the temperature rise in the rubber test sample and the dimensional changes of the sample over time. The flexometer test is well known to those skilled in rubber composition evaluations particularly for use in tires.

For the E' values, which are sometimes referred to as the "tensile storage modulus", reference may be made to *Science and Technology of Rubber*, second edition, 1994, Academic Press, San Diego, Calif., edited by James E. Mark et al, pages 249–254. The use of the storage modulus, E', to characterize rubber compositions is well known to those having skill in such art.

The tangent delta, or "tan. delta", is a ratio of the tensile loss modulus, also known as E", to the tensile storage modulus (E'). These properties, namely the E', E" and tan. delta, characterize the viscoelastic response of a rubber test sample to a tensile deformation at a fixed frequency and temperature, measured at 100° C.

The tan. delta and tensile storage modulus (E') are well known to those skilled in the rubber composition characterization art, particularly as it relates to tires and tire treads. The tensile storage modulus (E') values are indicative of rubber compound stiffness which can relate to treadwear rates and evenness of treadwear. The tan. delta value at 100° C. is considered as being indicative of hysteresis, or heat loss.

The tear resistance, characterized as the force per unit width necessary to tear a sample of a specific geometry, correlates to the tire's ability to withstand damage and is well known to those skilled in rubber composition evaluations for use in tires. Improvements in the tear resistance of a compound without sacrificing stiffness (as measured by E' at 60° C.) or 300% modulus are rare in rubber compositions for use in tires. This is also well known to those skilled in the art.

The DIN abrasion rating is the relative amount of volume a sample loses, compared to a control sample, when undergoing abrasion against a standardized surface. Lower DIN abrasion ratings, therefore, indicate less rubber loss, thus, improved resistance to wear. DIN and other abrasion tests are well known to those having skill in such art.

The peel adhesion comparison is a measure of tear resistance values for samples B and C, verses the tear resistance value of the control sample X, which shows an improvement in tear resistance on the order of 15–30 percent for samples B and C, which may be, as considered herein, predictive of tire damage resistance when these compositions are used as the tread cap compound. A description of the peel adhesion test may be found, for example, in U.S. Pat. No. 5,310,921.

Further, the DIN abrasion ratings of samples A, B, and C, when compared to the DIN abrasion rating of the control sample X, show a reduction in volume loss to the order of 20%. This may be correlated to an improvement in treadwear rate performance should these compositions be used as the tread cap compound on a radial medium truck tire.

The improvements shown in tear resistance and DIN abrasion ratings are further noteworthy when taking the consistency of other physical properties into consideration. For example, to achieve tear improvements at equivalent 300% modulus and E' at 60° C. values is greatly desired but not that common.

Indeed, it is considered herein to be significant that the tire tread cap composition candidates, represented by Samples A, B and C are composed of E-SBR-A, 12% bound styrene.

In particular, it is considered herein that rubber composition properties of the tire tread cap rubber compositions B taken together with tire base composition Y, particularly when compared with comparative control tire cap composition X, are predictive that a cap/base tread construction of this invention will provide a tire with enhanced (i) treadwear and durability as evidenced by the treadwear rating durability values; and (ii) acceptable heat rise as evidenced by the heat rise rating.

It is further believed herein that reduction in tire operating temperatures when under load will improve the rolling resistance, namely, by reducing rolling resistance and, thus, improving vehicular fuel economy.

Indeed it is considered herein that the cooperative combination of the outer tread cap and underlying tread base provides the following benefit: improved treadwear and better damage resistance, namely running under load, which is predictively evidenced by the DIN abrasion and tear values. This is considered as being beneficial to truck tire users by promoting a longer lasting tire, due to the longer wearing tread concept, and acceptable tire running temperature with potential less susceptibility to damage.

This is considered as being beneficial to truck tire users by providing a tire which can be longer lasting, due to the longer wearing tread concept and acceptable tire running temperature with potential less susceptibility to damage. In addition, it is believed that improvement in the tire tread uniformity or evenness of wear improves vehicle fuel economy attributable to tires.

EXAMPLE II

Tires of size 295/75R22.5 were produced with treads of co-extruded cap/base construction with the tread base being of the Sample Y composition and the tread cap being rubber compositions shown as Sample B and Control Sample X of Example I herein as demonstrated in Table 1 and correspondingly identified herein as tires B and X. The treads of the tires were of a design composed of three circumferential, continuous ribs with two continuous, circumferential grooves therebetween and with a net to gross ratio of about 78 percent.

The tires were tested by conventional tire testing procedures with results shown in the following Table 3. The Control tire for this Example is Tire X, which utilized the rubber composition shown by Sample X of Table 1 herein. The values for the Control Tire X are normalized to values of 100 and the associated values for Tire B are recited with values comparative to the values for the Control Tire X. Tire B utilized the rubber tread composition shown by Sample B of Table I herein.

TABLE 3

| Test Values | Tire X | Tire B |
|---|---|---|
| Endurance[1] | 100 | 110 |
| Heat Rise[2] | 100 | 100 |
| Treadwear[3] | 100 | 111 |
| Traction[4] | 100 | 99 |
| Wet Skid[5] | 100 | 97 |
| Tire Damage Resistance[6] | 100 | 95 |

[1]The endurance values are measured by a procedure described in ASTM F551 but where the tire is affixed under various loads and speeds against a 120" diameter fly wheel. The mileage which the tire accumulates to the point of failure is considered a measure of the tire endurance. In this Table 3, the control tire (X) is given a rating of 100. Ratings greater than 100 for the experimental Tire B indicates a better performance for Tire B.
[2]Heat rise or heat build-up in the tire is determined by a procedure based on the method in ASTM F551 and then measuring the temperature of the tire tread in both shoulder regions and also the center-line of the tread. Tire B and control tire X had similar, comparable heat rise values.
[3]Treadwear resistance is determined by mounting the tires on the drive axle of an 18 wheel tractor trailer combination with a determined gross vehicle weight in excess of 65,000 lbs. and measuring the rate of wear by a procedure based on that described in ASTM F421 and ASTM F1016.
[4]Wet traction measured under cornering conditions is described in ASTM F376 and F403. A test procedure based on these methods was followed and the test data was expressed in ratings with the control "X" tire at 100. The traction performance of the test tire "B" which rated at 99 is considered to be equal to the control.
[5]Wet skid is determined by mounting tires on a straight truck, running the vehicle to a predetermined velocity, applying brakes and measuring vehicle stopping distance.
[6]Tire damage resistance is determined by mounting tires on a vehicle and then driving the vehicle over a series of curbs orientated at an angle, in the shape of a zig-zag configuration so as to induce tread tearing, cutting, and cause shrinking of the tire tread surface. Performance ratings are a subjective measure of the tire's ability to resist damage compared to a control tire. Higher ratings are better.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a TRA rated maximum load limit of at least about 2684 lbs (1220 kg) at an inflation pressure in a range of about 80 to about 120 psi (about 550 kpa to about 830 kpa) and a tire bead diameter in a range of about 19 to about 25 inches (48 to about 64 cm) having a rubber tread of a cap/base construction characterized in that, for said cap/base tread:

(A) the tread cap is comprised of, based on 100 parts by weight rubber, (1) about 40 to 90 phr of emulsion polymerization prepared styrene/butadiene polymer having a bound styrene content of between 5 and 15 weight percent and, a Tg in a range of about −65° C. to about −80° C., and a random styrene distribution as evidenced by having less than ten percent of its styrene content in more than ten sequential styrene units (E-SBR-A), and correspondingly (2) about 10 to about 60 phr of at least one additional diene-based elastomer selected from at least one of homopolymers of 1,3-butadiene, homopolymers of isoprene, copolymers of 1,3-butadiene and isoprene and copolymers of 1,3-butadiene and styrene other than said E-SBR-A, and (B) the tread base includes elastomer comprised of cis 1,4-polyisoprene natural rubber.

2. The tire of claim 1 wherein the tread base rubber also includes about 10 to about 20 phr of at least one additional diene-based synthetic elastomer selected from at least one of homopolymers of 1,3-butadiene and of isoprene and copolymers of 1,3-butadiene and isoprene and copolymers of 1,3-butadiene and styrene.

3. The tire of claim 2 wherein said tread cap has a tread design composed of at least three circumferential continuous ribs designed to be road contacting, said ribs independently separated by continuous, circumferential grooves.

4. The tire of claim 1 wherein the said additional elastomer is selected from at least one of cis 1,4-polyisoprene natural rubber, emulsion polymerization prepared styrene/butadiene copolymer having a bound styrene content of about 21 to about 40 weight percent and a Tg in a range of about −50° C. to about −65° C. (E-SBR-B), organic solution polymerization prepared styrene/butadiene copolymer (S-SBR), cis 1,4-polybutadiene elastomer, medium to high vinyl polybutadiene rubber having a vinyl content from about 30 to about 90 percent, trans 1,4-polybutadiene elastomer, isoprene/butadiene copolymer rubber and styrene/isoprene/butadiene terpolymer rubber.

5. The tire of claim 4 wherein said tread cap has a tread design composed of at least three circumferential continuous ribs designed to be road contacting, said ribs independently separated by continuous, circumferential grooves.

6. The tire of claim 1 wherein said tread cap has a tread design composed of at least three circumferential continuous ribs designed to be road contacting, said ribs independently separated by continuous, circumferential grooves.

* * * * *